(12) United States Patent
Dueck

(10) Patent No.: US 7,370,843 B2
(45) Date of Patent: May 13, 2008

(54) RETRACTABLE LOAD SUPPORT SYSTEM

(75) Inventor: Raymond Dueck, Arborg (CA)

(73) Assignee: Vidir Machine, Inc., Arborg, Manitoba (CA)

( * ) Notice: Subject to any disclaimer, the term of this patent is extended or adjusted under 35 U.S.C. 154(b) by 80 days.

(21) Appl. No.: 11/381,490

(22) Filed: May 3, 2006

(65) Prior Publication Data

US 2007/0267612 A1 Nov. 22, 2007

(51) Int. Cl.
  *B66D 1/00* (2006.01)
(52) U.S. Cl. ...................... 254/277; 254/376
(58) Field of Classification Search ............ 254/277, 254/375–377
  See application file for complete search history.

(56) References Cited

U.S. PATENT DOCUMENTS

| | | | | |
|---|---|---|---|---|
| 4,964,491 A | * | 10/1990 | Dombrowski et al. ...... | 188/318 |
| 5,531,246 A | * | 7/1996 | Ritter .................... | 137/355.21 |
| 5,718,411 A | * | 2/1998 | Baughan et al. ........... | 254/323 |
| 5,904,371 A | * | 5/1999 | Koning .................. | 280/806 |
| 5,918,573 A | * | 7/1999 | Killion .................. | 123/192.2 |
| 5,934,596 A | * | 8/1999 | Gorman et al. ........... | 242/379.1 |
| 6,234,417 B1 | * | 5/2001 | Sauder et al. ............ | 242/381 |
| 6,382,322 B1 | * | 5/2002 | Gipson .................. | 166/379 |
| 6,672,428 B2 | * | 1/2004 | Gelman ................. | 182/233 |
| 6,752,342 B1 | * | 6/2004 | Nagler ................... | 242/390.5 |

OTHER PUBLICATIONS

Vian Enterprises, Inc., website printout, What is a Gerotor, 2 Pages, publication date unknown.
Vulcan Spring, website printout, 8 pages, publication date unknown.

* cited by examiner

*Primary Examiner*—Emmanuel M Marcelo
(74) *Attorney, Agent, or Firm*—Michael S. Neustel

(57) ABSTRACT

A retractable load support system for effectively lifting a load in a controlled manner. The retractable load support system includes a frame, a gerotor attached to a main shaft within said frame, a first spool attached to the gerotor, a biasing device connected to the first spool applying a biasing force to the first spool and an elongated member attached to the first spool. The main shaft is rotatably supported within the frame by a one way bearing allowing the main shaft to rotate when the elongated member is drawn downwardly to reduce the resistance of the gerotor. The main shaft is supported substantially stationary within the frame by the one way bearing preventing the main shaft from rotating when the elongated member is drawn upwardly onto the first spool thereby lifting the load in a controlled manner.

20 Claims, 16 Drawing Sheets

_US 7,370,843 B2_

RETRACTABLE LOAD SUPPORT SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to bicycle storage devices and more specifically it relates to a retractable load support system for effectively lifting a load in a controlled manner.

2. Description of the Related Art

Any discussion of the prior art throughout the specification should in no way be considered as an admission that such prior art is widely known or forms part of common general knowledge in the field.

Bicycle storage devices have been in use for years. Conventional bicycle storage devices are typically comprised of non-movable hook structure that is attached to the ceiling or a wall. One or both of the wheels are then positioned upon the non-movable hook to elevate the bicycle above the floor of a garage or other area.

The main problem with conventional bicycle storage devices is that they require the user to manually lift the bicycle which can require significant physical effort. In addition, lifting a bicycle can be difficult because of the awkward and unbalanced nature of the bicycle, particularly with the front wheel of the bicycle rotatably attached to the frame of the bicycle. A further problem with conventional bicycle storage devices is that they are not suitable for use on ceilings of extreme heights.

While these devices may be suitable for the particular purpose to which they address, they are not as suitable for effectively lifting a load in a controlled manner. Conventional bicycle storage devices do not provide for a convenient system for raising and lowering a load with respect to a storage position.

In these respects, the retractable load support system according to the present invention substantially departs from the conventional concepts and designs of the prior art, and in so doing provides an apparatus primarily developed for the purpose of effectively lifting a load in a controlled manner.

BRIEF SUMMARY OF THE INVENTION

In view of the foregoing disadvantages inherent in the known types of bicycle storage devices now present in the prior art, the present invention provides a new retractable load support system construction wherein the same can be utilized for effectively lifting a load in a controlled manner.

The general purpose of the present invention, which will be described subsequently in greater detail, is to provide a new retractable load support system that has many of the advantages of the bicycle storage devices mentioned heretofore and many novel features that result in a new retractable load support system which is not anticipated, rendered obvious, suggested, or even implied by any of the prior art bicycle storage devices, either alone or in any combination thereof.

To attain this, the present invention generally comprises a frame, a gerotor attached to a main shaft within said frame, a first spool attached to the gerotor, a biasing device connected to the first spool applying a biasing force to the first spool and an elongated member attached to the first spool. The main shaft is rotatably supported within the frame by a one way bearing allowing the main shaft to rotate when the elongated member is drawn downwardly to reduce the resistance of the gerotor. The main shaft is supported substantially stationary within the frame by the one way bearing preventing the main shaft from rotating when the elongated member is drawn upwardly onto the first spool thereby lifting the load in a controlled manner.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a retractable load support system that will overcome the shortcomings of the prior art devices.

A second object is to provide a retractable load support system for effectively lifting a load in a controlled manner.

Another object is to provide a retractable load support system that conveniently lifts a load such as a bicycle into an upper storage position within the interior of a building.

An additional object is to provide a retractable load support system that does not require a user to physically lift the bicycle into a storage position.

A further object is to provide a retractable load support system that may be utilized to lift and store various types of loads including but not limited to bicycles.

Another object is to provide a retractable load support system that automatically aligns the load to a desired rotational alignment when in the storage position.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
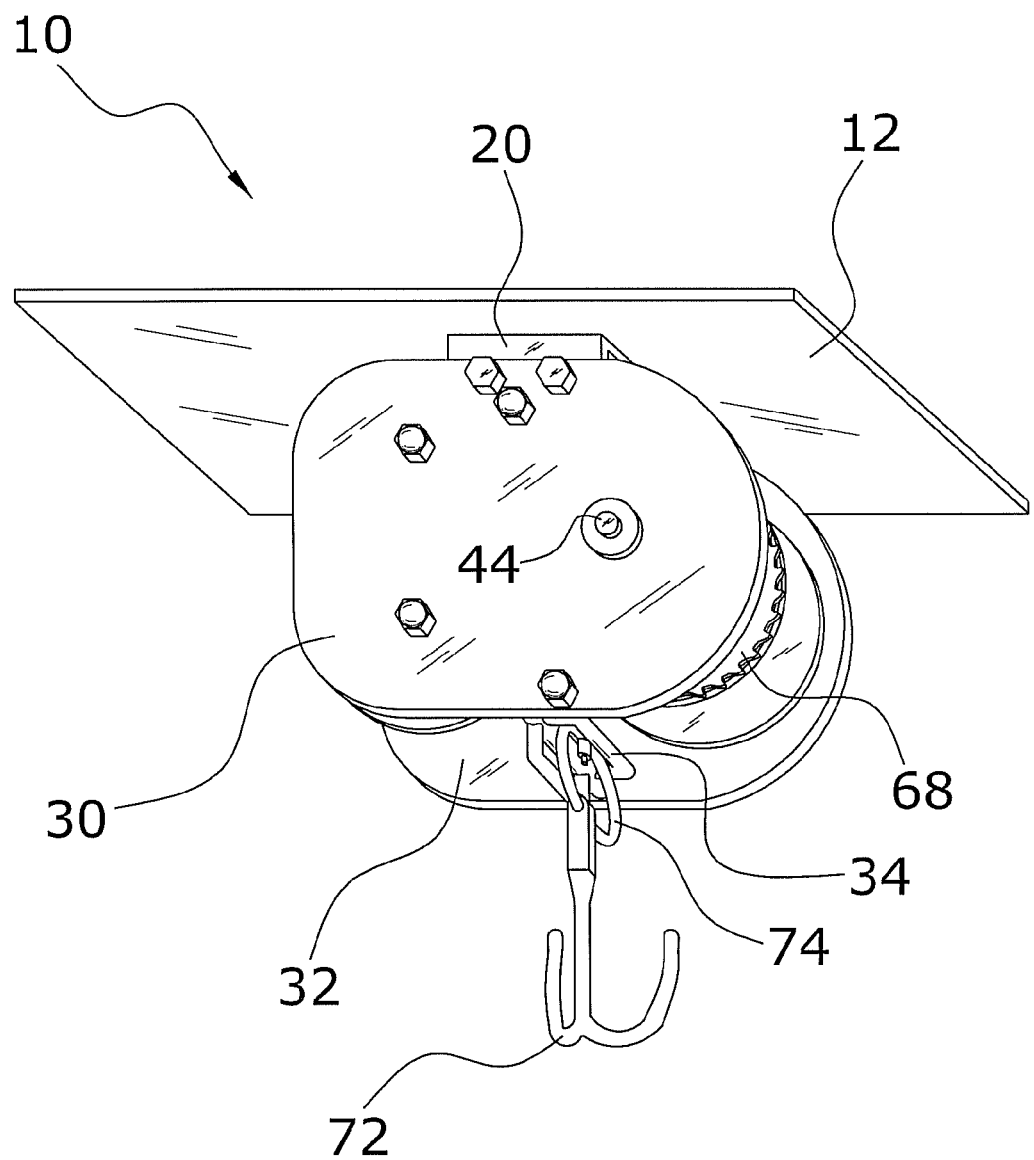
FIG. 1 is a lower perspective view of the present invention attached to a ceiling.

Turning now descriptively to the drawings, in which similar reference characters denote similar elements throughout the several views, FIGS. 1 through 12c illustrate a retractable load support system 10, which comprises a frame 30, 32, a gerotor 42 attached to a main shaft 44 within said frame 30, 32, a first spool 60 attached to the gerotor 42, a biasing device connected to the first spool 60 applying a biasing force to the first spool 60 and an elongated member 70 attached to the first spool 60. The main shaft 44 is rotatably supported within the frame 30, 32 by a one way bearing 40 allowing the main shaft 44 to rotate when the elongated member 70 is drawn downwardly to reduce the resistance of the gerotor 42. The main shaft 44 is supported substantially stationary within the frame 30, 32 by the one way bearing 40 preventing the main shaft 44 from rotating when the elongated member 70 is drawn upwardly onto the first spool 60 thereby lifting the load 14 in a controlled manner.

B. Frame

FIGS. 1 through 12c of the drawings illustrate the present invention and an exemplary frame 30, 32 suitable for use with the present invention. The frame 30, 32 may be comprised of various other structures capable of housing and supporting the various components of the present invention.

The frame 30, 32 preferably includes a first sidewall 30 and a second sidewall 32 in opposition to one another. The first sidewall 30 and the second sidewall 32 are preferably comprised of substantially parallel flat structures as best illustrated in FIGS. 1 through 3 of the drawings.

Figure 3:
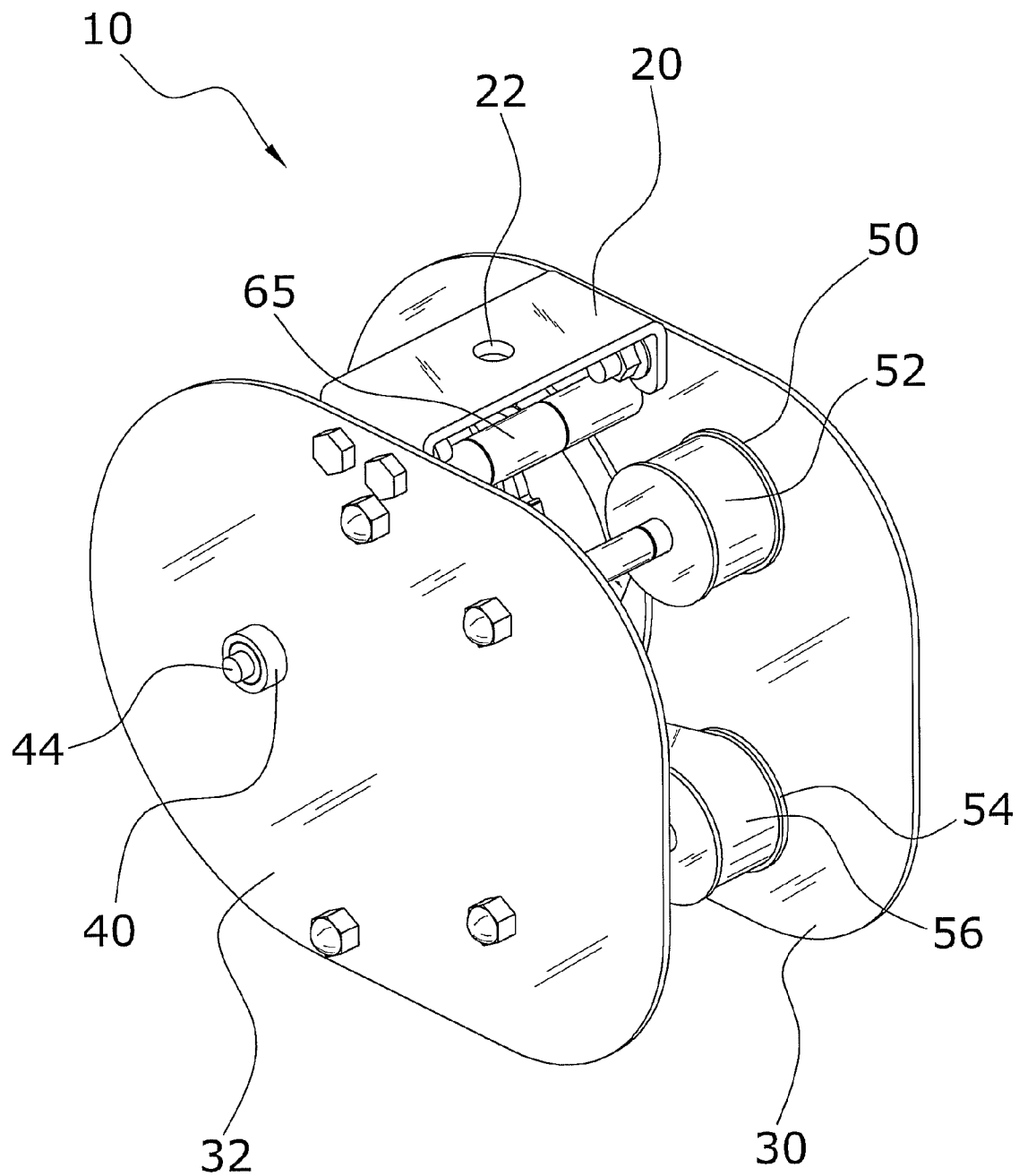
FIG. 3 is a rear upper perspective view of the present invention.
Figure 4:
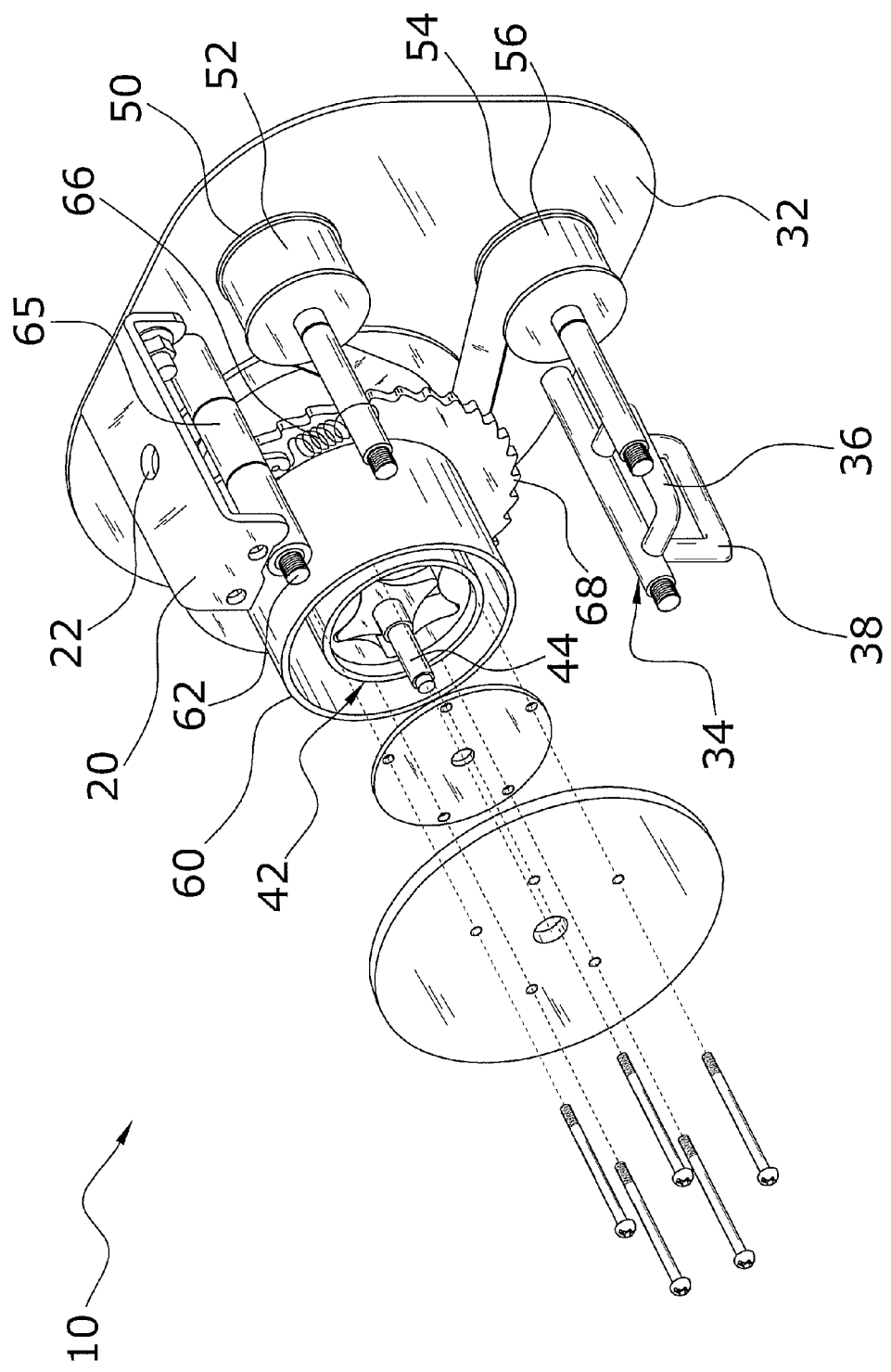
FIG. 4 is an exploded upper perspective view of the present invention illustrating the internal components of the present invention.
Figure 5:
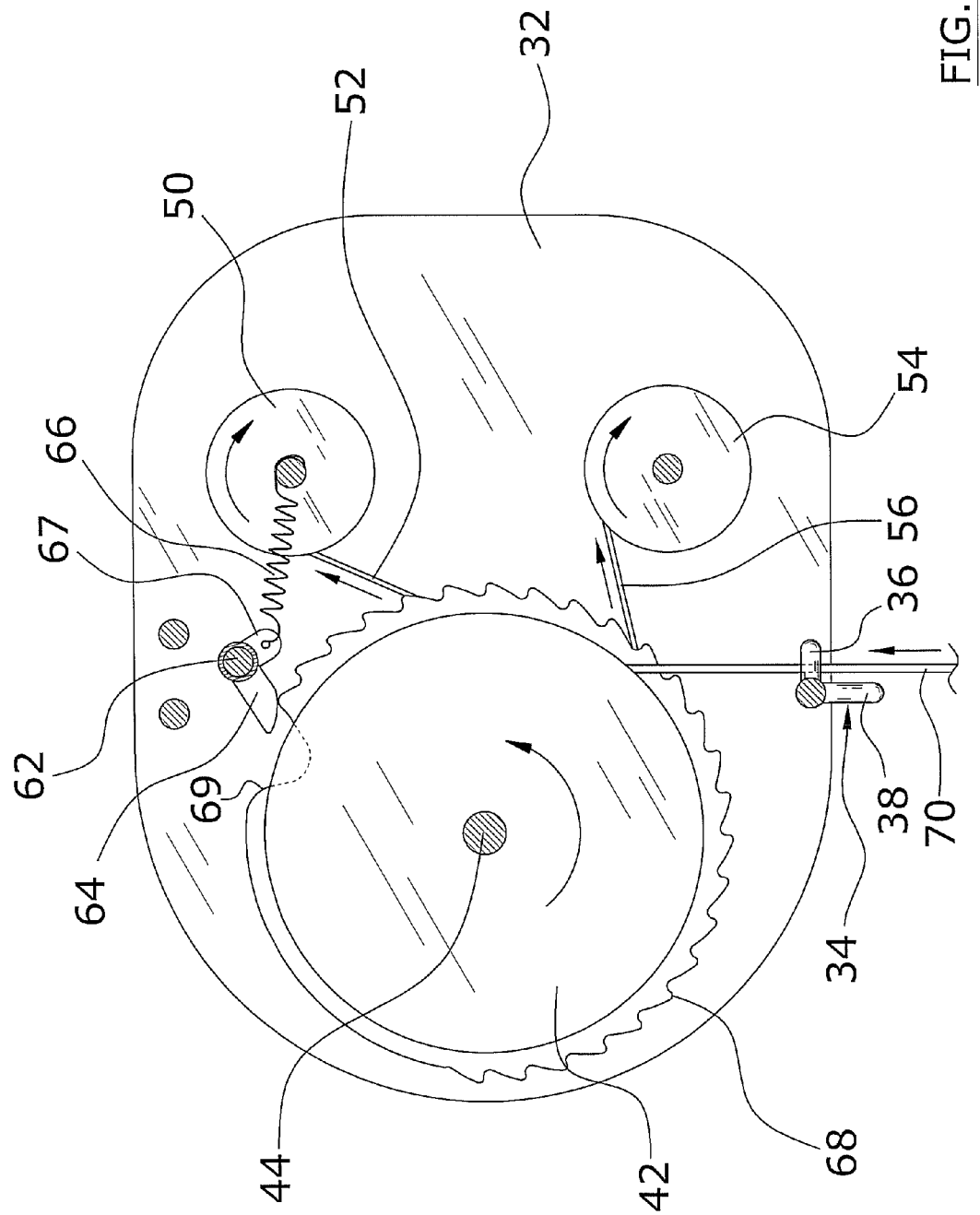
FIG. 5 is a side cutaway view of the present invention illustrating the raising of the elongated member to lift a load.
Figure 6:
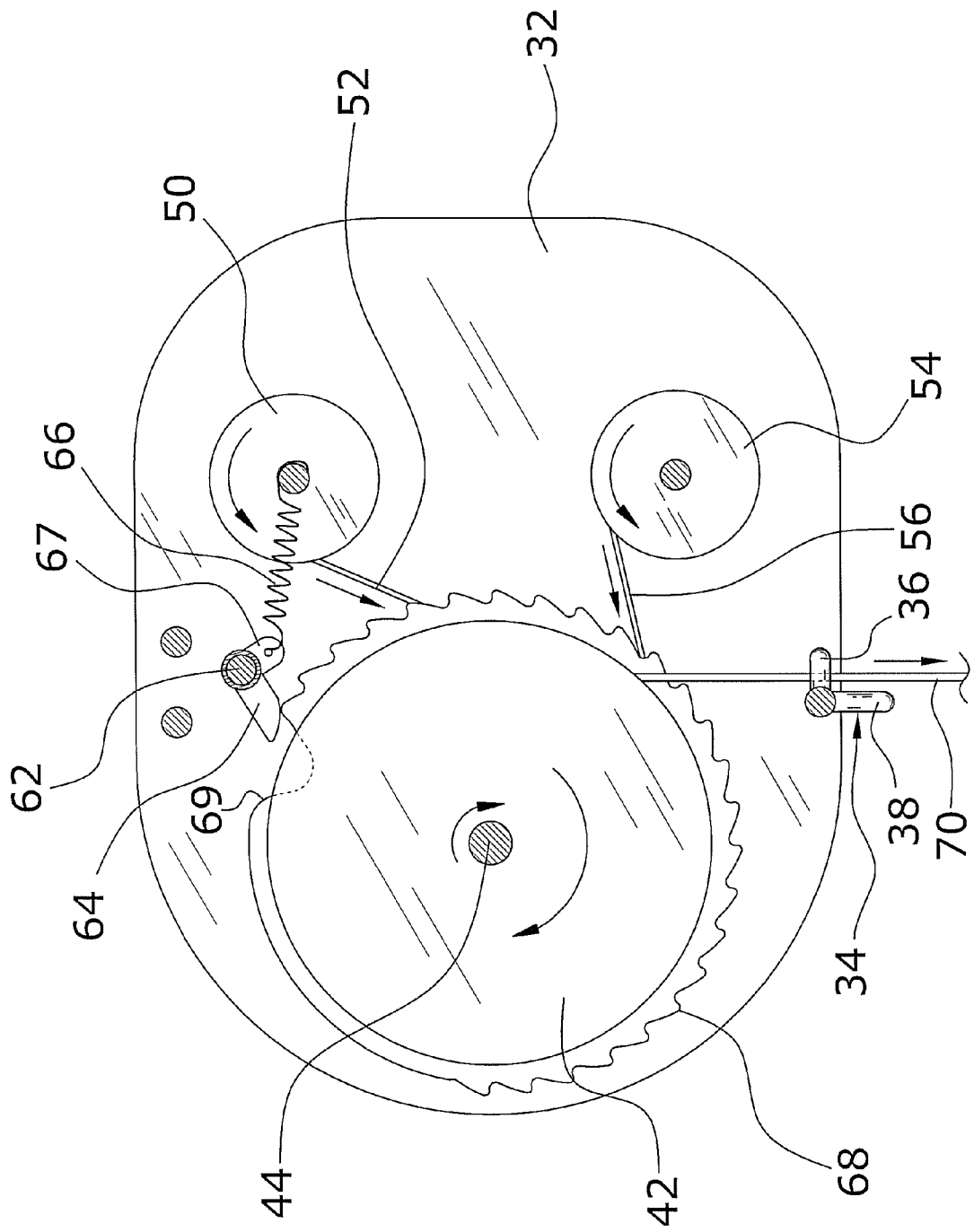
FIG. 6 is a side cutaway view of the present invention illustrating the lowering of the elongated member to lower a load.
Figure 7:
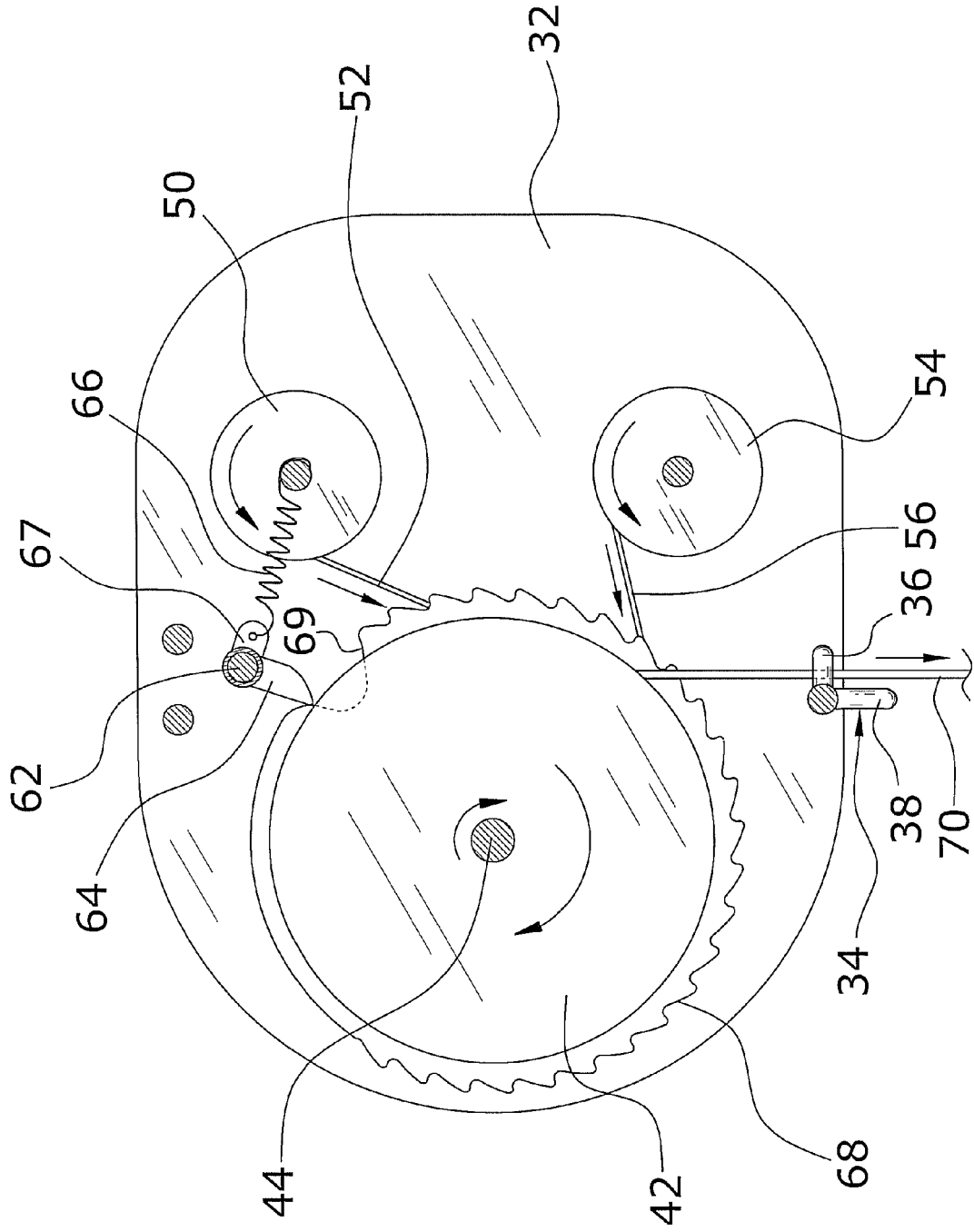
FIG. 7 is a side cutaway view of the present invention with the catch member positioned partially within the recessed area of the sprocket when the elongated member is being lowered.
Figure 8:
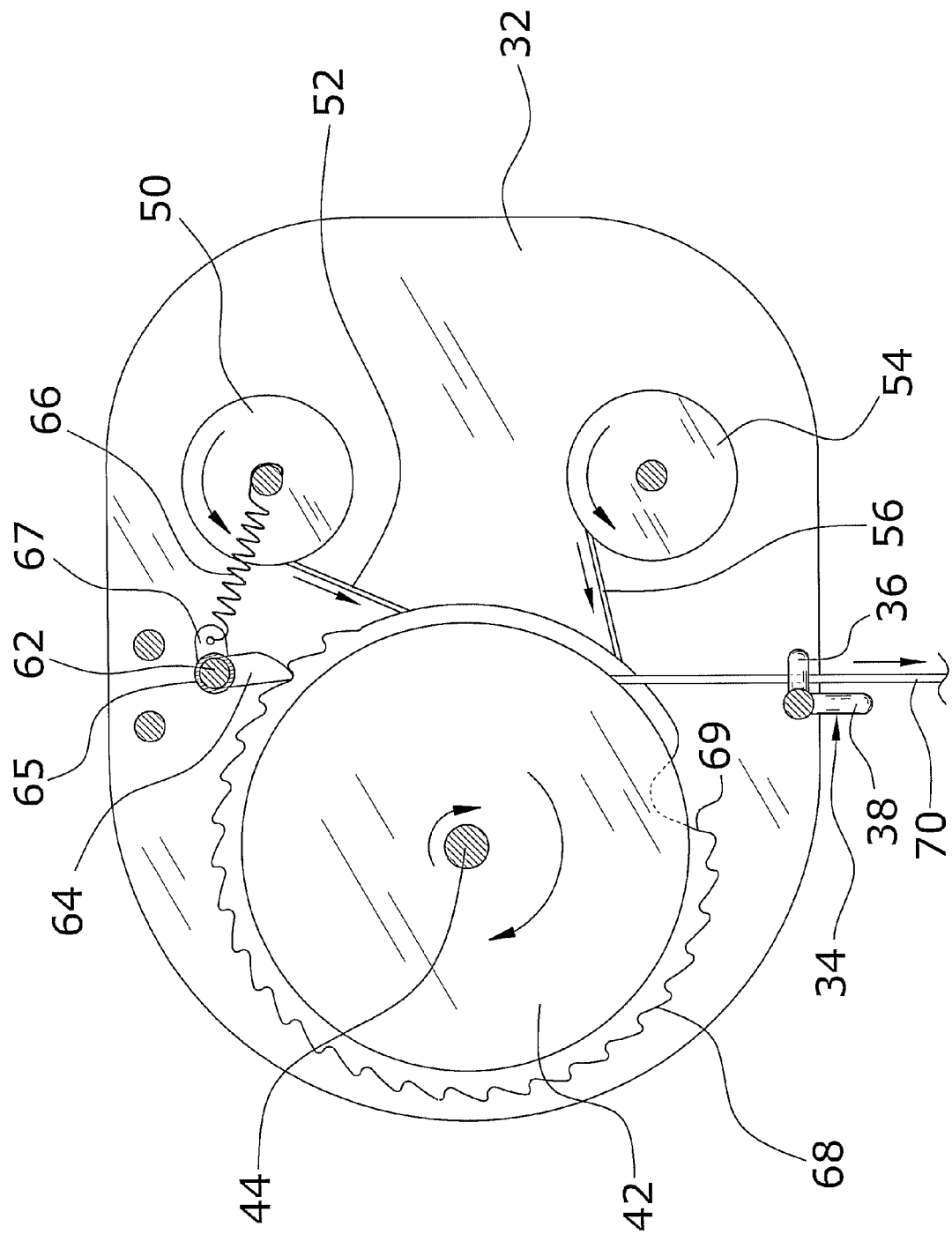
FIG. 8 is a side cutaway view of the present invention with the catch member engaging the cogs of the sprocket in a manner to prevent raising of the elongated member and load.

As illustrated in FIGS. 1 through 5 of the drawings, a main shaft 44 extends between a first sidewall 30 and a second sidewall 32 of the frame 30, 32. The main shaft 44 is rotatably supported within the frame 30, 32 by a one way bearing 40 at least in one of the sidewalls 30, 32 thereby allowing the main shaft 44 to rotate when the elongated member 70 is drawn downwardly to reduce the resistance of the gerotor 42 as illustrated in FIGS. 6 through 8 of the drawings. The main shaft 44 is prevented from rotating when the elongated member 70 is drawn upwardly onto the first spool 60 thereby lifting the load 14 in a controlled manner as illustrated in FIG. 5 of the drawings. The main shaft 44 may be supported by one or more one way bearings 40.

Figure 2:
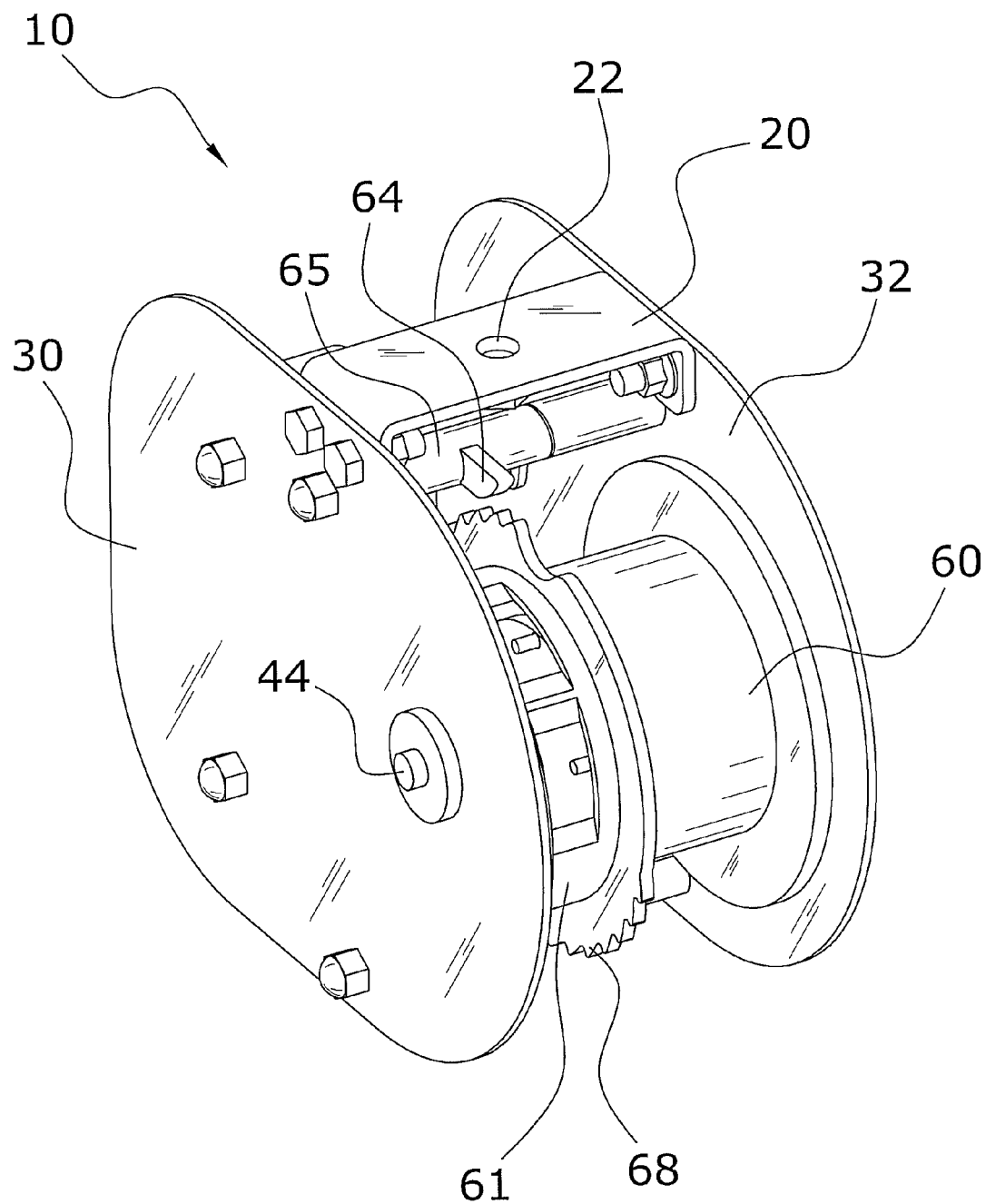
FIG. 2 is a front upper perspective view of the present invention.

A mounting plate 20 is preferably attached to the upper portion of the frame 30, 32 as shown in FIGS. 2 and 3 of the drawings. The mounting plate 20 preferably includes at least one aperture 22 to mount the frame 30, 32 to a ceiling 12 with conventional fasteners (e.g. bolts).

C. Gerotor

A gerotor 42 is attached to the main shaft 44 as illustrated in FIGS. 2 and 4 through 10 of the drawings. The gerotor 42 is for dampening the raising of the elongated member 70 onto the first spool 60 to prevent the elongated member 70 and a load 14 from being lifted in a relatively fast manner which can damage the load 14 or the present invention.

The gerotor 42 may be comprised of any conventional positive displacement pump mechanism that delivers a quantity of fluid in proportion to speed. The gerotor 42 includes suction ports for drawing fluid into the gerotor 42 and discharge ports for dispensing fluid. In the present invention the suction ports are fluidly connected to the discharge ports to circulate the fluid in a controlled manner to dampen the rotation of the first spool 60 when raising the elongated member 70. As illustrated in FIG. 4 of the drawings, the gerotor 42 is comprised of an inner rotor that is attached to the main shaft 44 that rotates within an outer stator of the gerotor 42 to draw and dispense the fluid. The inner rotor rotates in the same direction as the outer stator during use. VIAN ENTERPRISES INC. in Auburn, Calif. manufactures various types of gerotors 42 suitable for the present invention.

D. First Spool

The first spool 60 is attached to the outer stator of the gerotor 42 as best illustrated in FIG. 2 of the drawings. The first spool 60 is comprised of a relatively broad structure that has sidewalls to receive the springs 52, 56.

E. Elongated Member

An elongated member 70 is attached to the first spool 60. The first spool 60 dispenses and receives the elongated member 70. The elongated member 70 is preferably comprised of any conventional flexible member that is capable of lifting and supporting a load 14 such as a bicycle. The elongated member 70 may be comprised of but is not limited to a cable, a chain, a strap, a rope and the like. The length of the elongated member 70 is preferably sufficient to lower the load 14 close enough to the ground for a user to remove the load 14 from the engaging member 72.

The engaging member 72 is attached to the elongated member 70 opposite of the first spool 60 for engaging a load 14. The engaging member 72 is preferably comprised of a two prong hook as best illustrated in FIG. 1 of the drawings, however the engaging member 72 may be comprised of other engaging structures (e.g. single hook, clamps).

Figure 12A:
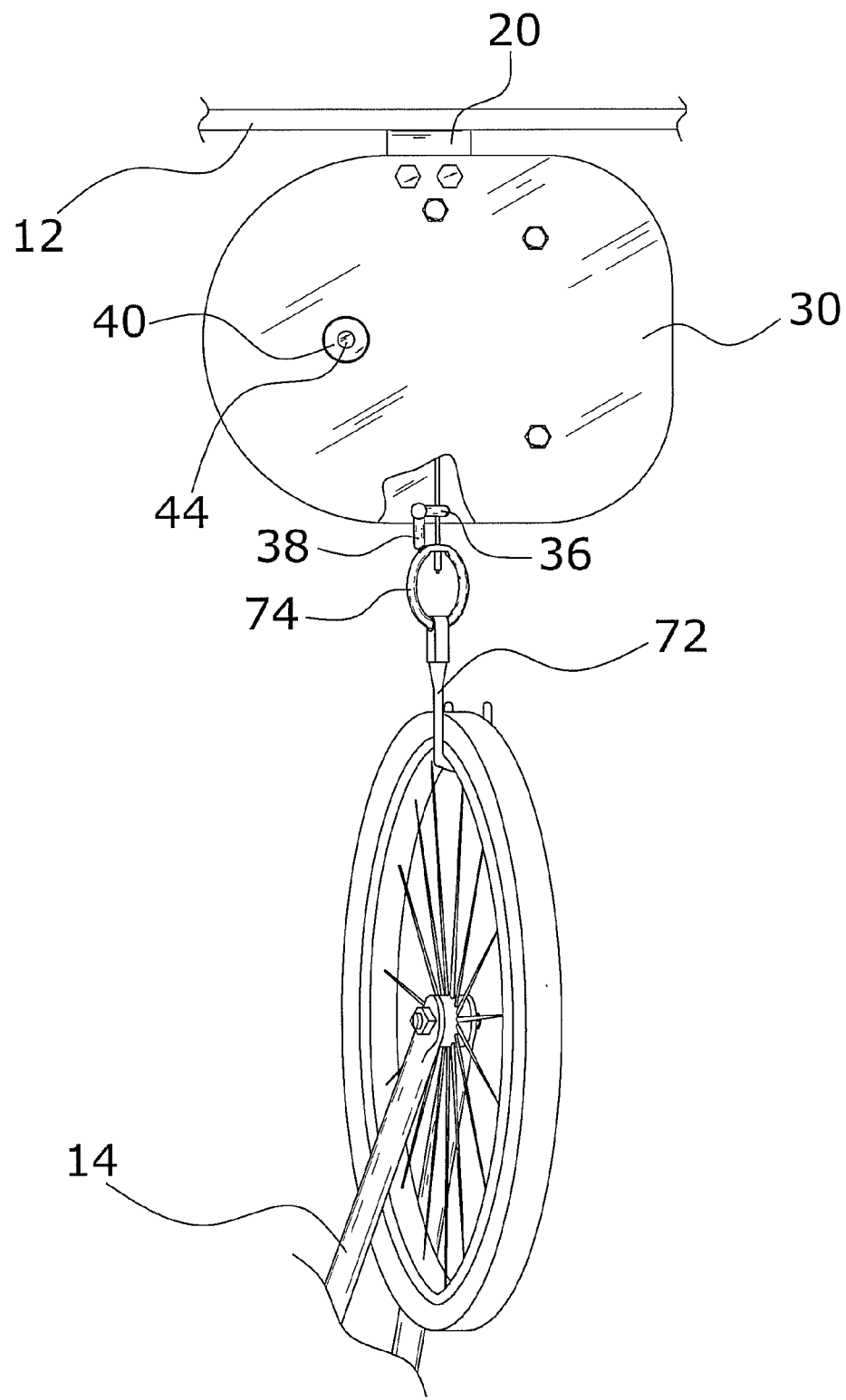
FIG. 12a is a side view of the present invention with the guide member initially engaging the vertical guide in a non-aligned position.
Figure 12B:
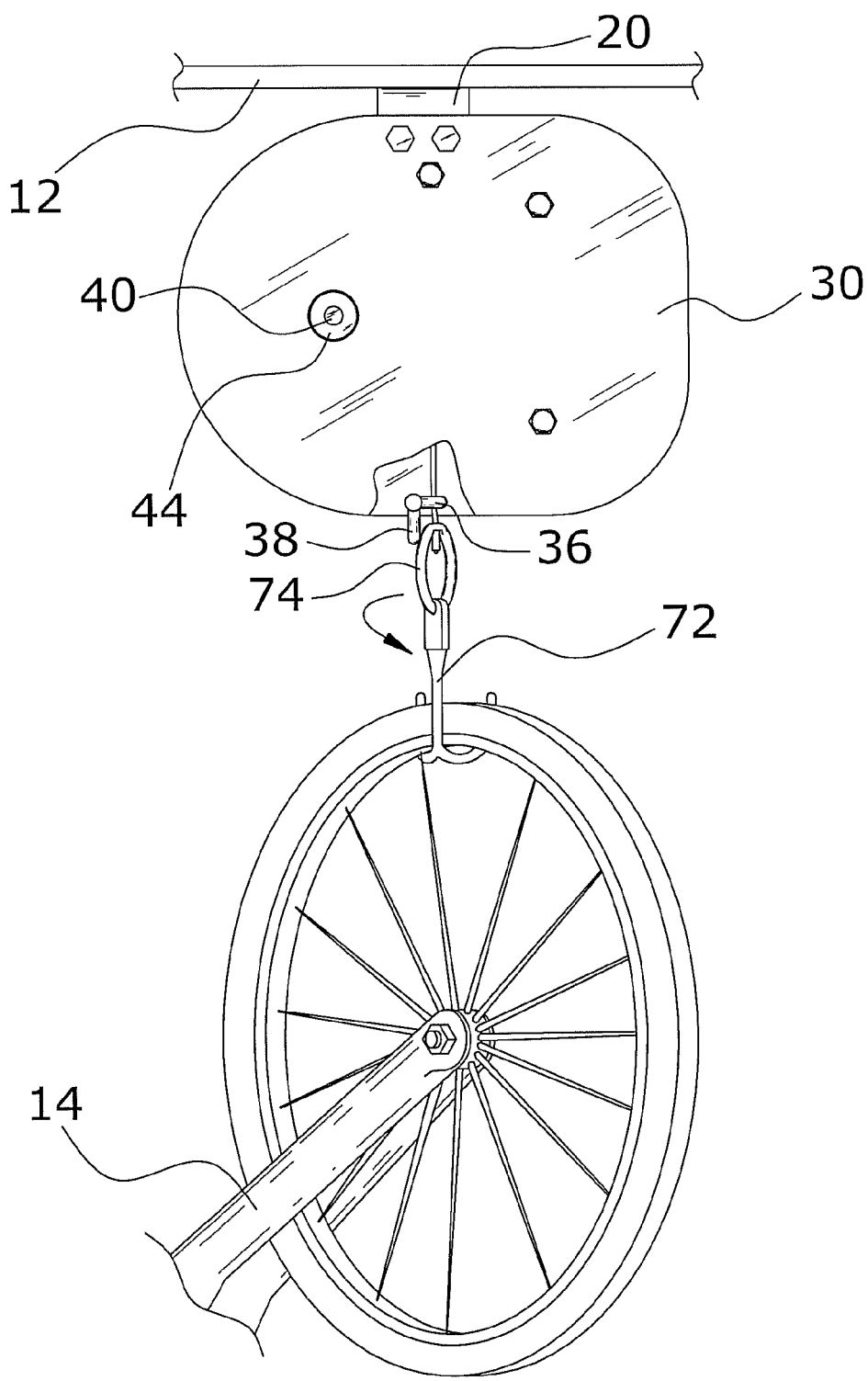
FIG. 12b is a side view of the present invention with the guide member rotating towards the aligned position.

A guide member 74 is preferably attached between the elongated member 70 and the engaging member 72. The guide member 74 is formed to engage the vertical guide 38 when the engaging member 72 is near the fully raised position as illustrated in FIGS. 12a and 12b of the drawings. The guide member 74 is preferably comprised of a ring structure as illustrated in FIG. 1 of the drawings. The guide member 74 may be integrally formed as part of the engaging member 72 or attached to the engaging member 72.

F. Guide Structure

A guide structure 34 is preferably attached to the frame 30, 32 to guide the elongated member 70 and to rotate the engaging member 72 into a desired rotational alignment when the engaging member 72 is in a fully raised position. When more than one of the present invention are utilized in a close proximity to one another, it can be important to ensure that the loads 14 supported by the engaging members 72 are in the same desired rotational position to prevent the loads 14 (e.g. bicycles) from getting in contact with one another.

Figure 9:
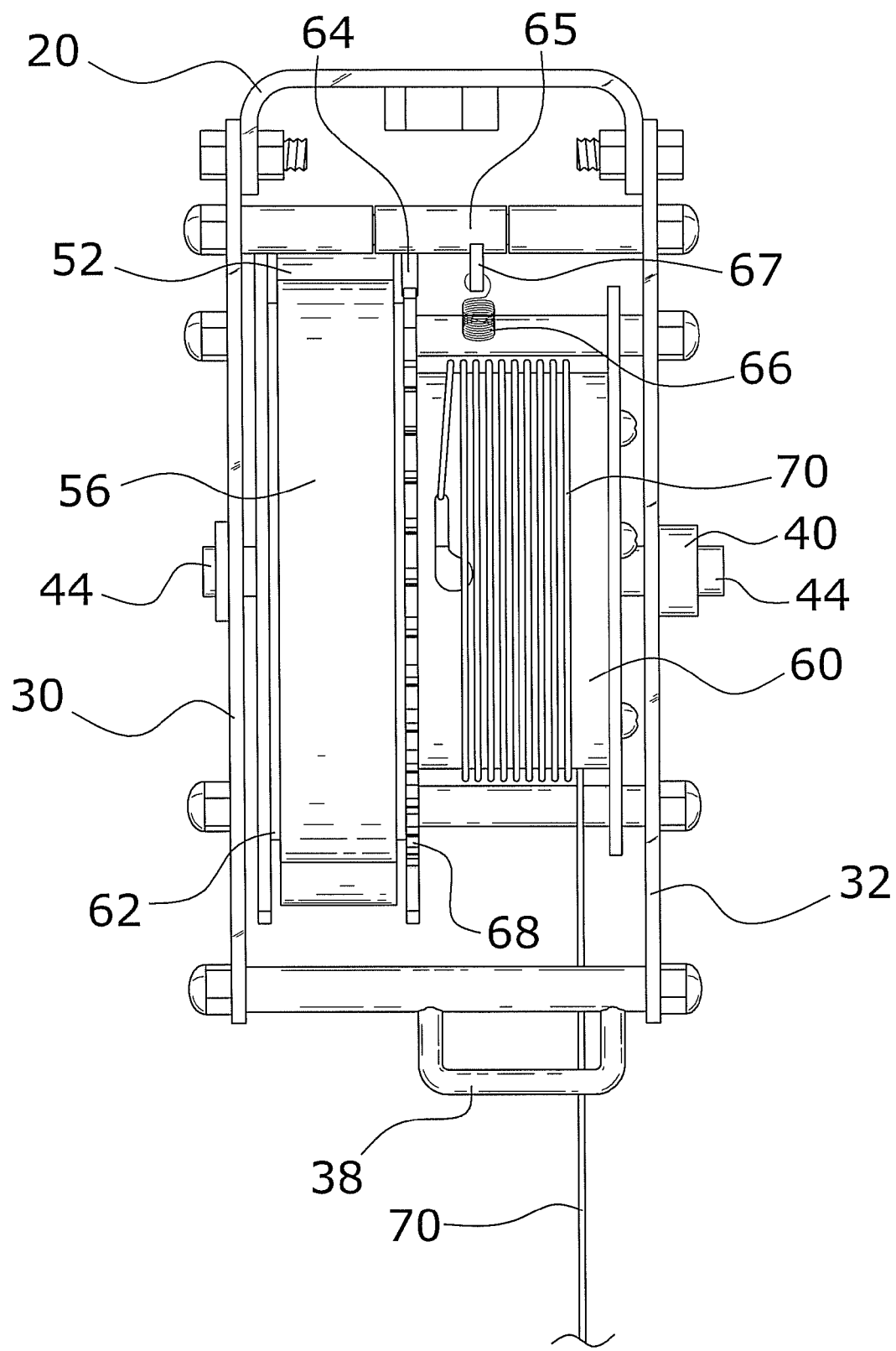
FIG. 9 is a front view of the present invention.
Figure 10:
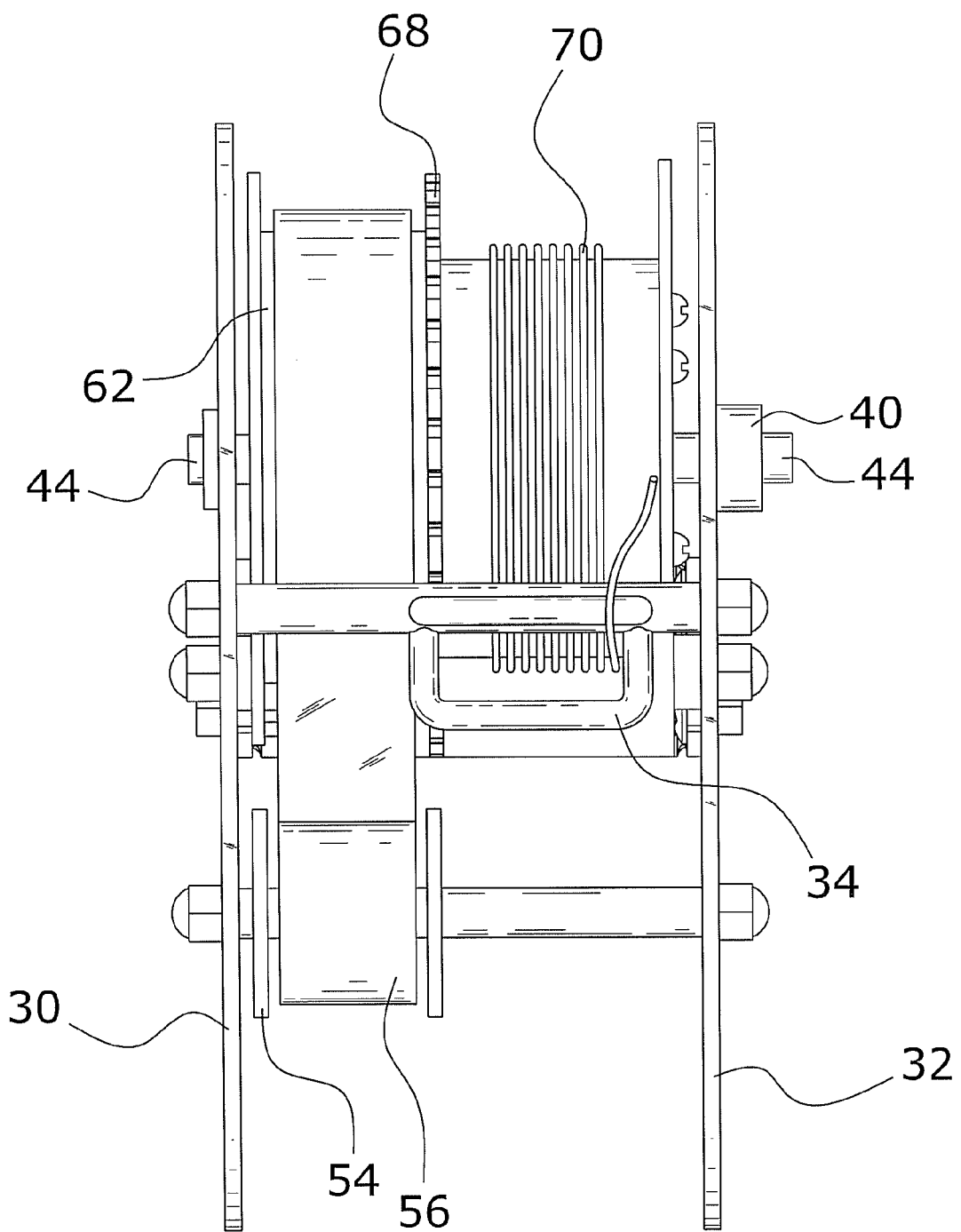
FIG. 10 is a bottom view of the present invention.

The guide structure 34 preferably includes a horizontal guide 36 and a vertical guide 38 extending substantially transverse with respect to one another. The guide structure 34 is preferably supported upon a shaft extending between the first sidewall 30 and the second sidewall 32 as shown in FIG. 9 of the drawings.

The horizontal guide 36 preferably receives and guides the elongated member 70 within to ensure that the elongated member 70 is properly dispenses and drawn upon the first spool 60. The horizontal guide 36 is preferably comprised of a structure including a guide hole that the elongated member 70 slidably passes through.

Figure 12C:
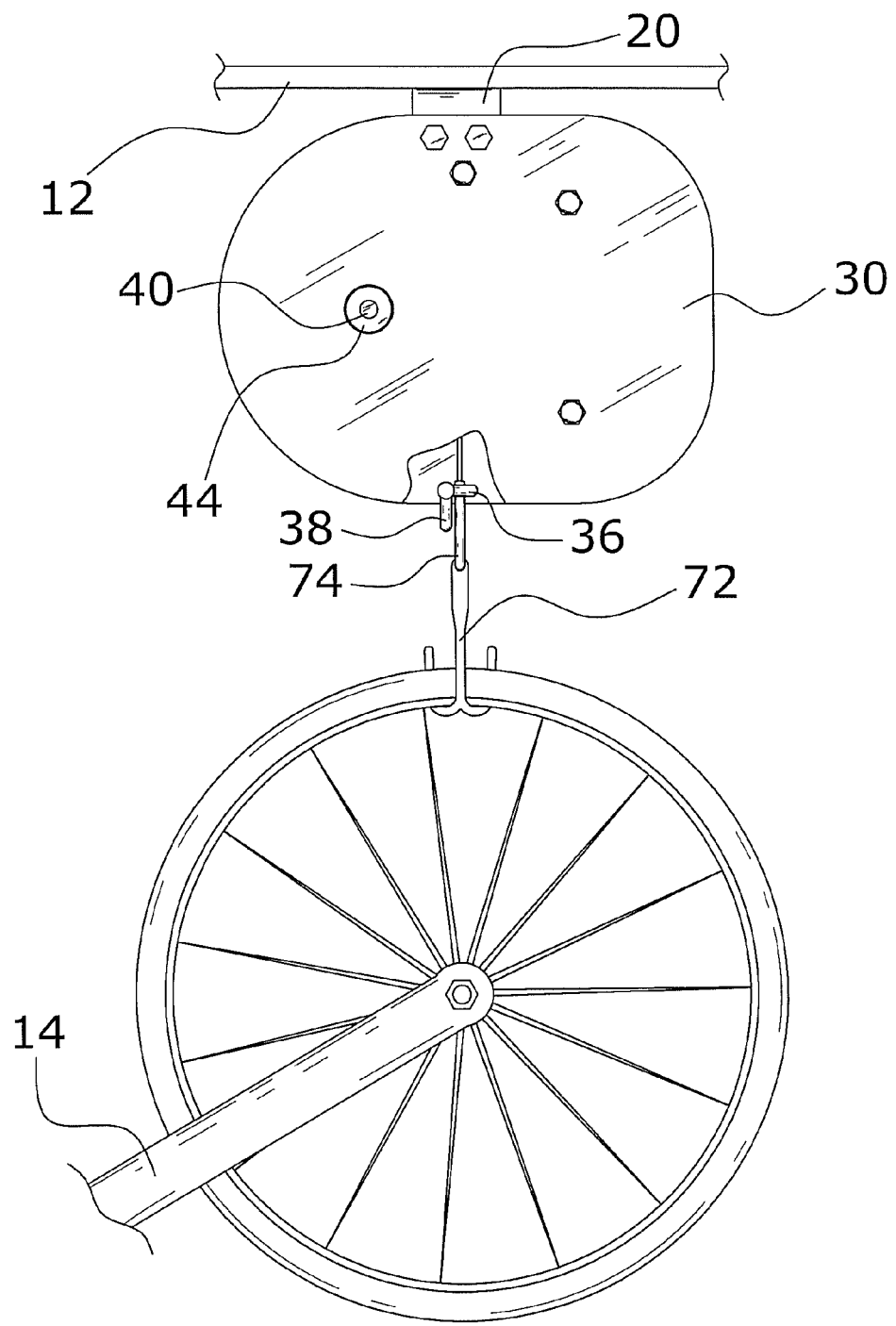
FIG. 12c is a side view of the present invention with the guide member rotated into the aligned position.

The vertical guide 38 extends downwardly with respect to the horizontal guide 36 as best illustrated in FIG. 7 of the drawings. The vertical guide 38 preferably is substantially parallel with respect to the elongated member 70 when the elongated member 70 is supporting a load 14. FIGS. 12a through 12c illustrate how the vertical guide 38 engages and rotates the guide member 74 so the engaging member 72 is positioned within a desired rotational position when in the raised position.

G. Biasing Device

At least one biasing device is connected to the gerotor 42 or other structure connected to the gerotor 42 for applying a biasing force to the gerotor 42. The biasing device is for applying sufficient force to lift a load 14 attached to the engaging member 72 without significant additional effort by a user.

The biasing device is preferably comprised of a first spring 52 and a second spring 56. The first spring 52 and the second spring 56 are each preferably comprised of coiled metal band springs that are attached to a second spool 61 in an overlapping manner. The second spool 61 is attached to the gerotor 42 thereby resulting in the application of a rotational biasing force upon the outer stator of the gerotor 42. The first spring 52 and the second spring 56 are further preferably attached to a first bracket 50 and a second bracket 54 respectively wherein the brackets 50, 54 are attached to the frame comprised of a spool structure.

The first spring 52 and the second spring 56 are preferably comprised of a constant force spring, a constant torque spring or a variable force spring. The first spring 52 and the second spring 56 jointly apply the rotational force upon the gerotor 42 to cause rotation of the first spool 60. VULCAN SPRING & MFG. CO. in Telford, Pa. manufactures suitable coiled metal band springs for use with the present invention.

H. Ratchet Assembly

A ratchet assembly is connected to the first spool 60 to prevent raising of the elongated member 70 when a user is pulling the elongated member 70 downwardly. The ratchet assembly is preferably comprised of a sprocket 68 attached to the first spool 60 with a catch member 64 in selective catchable engagement with the sprocket 68 to prevent raising of the elongated member 70 from the force of first spring 52 and the second spring 56. The sprocket 68 includes a plurality of cogs and at least one recessed area 69 as best illustrated in FIGS. 5 through 8 of the drawings.

The catch member 64 is preferably pivotally attached to a support shaft 62 as shown in FIGS. 5 through 8 of the drawings. A pivot member 65 is preferably rotatably attached to the support shaft 62 and the catch member 64 and the leverage member 67 are attached to the pivot member 65 as shown in FIG. 4 of the drawings. The support shaft 62 is attached to the frame 30, 32 to support the catch member 64. The catch member 64 catchably engages the cogs of the sprocket 68 when the catch member 64 is in a lowering position and when the elongated member 70 is being raised to prevent raising of the elongated member 70. The catch member 64 slides over the cogs of the sprocket 68 when in a raising position and when the elongated member 70 is being lowered to allow the elongated member 70 to be lowered. The catch member 64 is movable between the raising position and the lowering position when aligned with the recessed area 69 as shown in FIGS. 6 and 7 of the drawings.

A leverage member 67 is preferably attached to the catch member 64 as shown in FIGS. 5 through 8 of the drawings. A bias member 66 is attached to the leverage member 67 and to the frame 30, 32 for applying a bias force to the catch member 64. The bias member 66 is preferably comprised of a compression spring or the like.

I. Operation of Invention

In use, the present invention is attached to a ceiling 12 or a wall of the interior of a building structure (e.g. garage, store). The elongated member 70 is drawn outwardly from the first spool 60 through the guide structure 34 in a downward manner until the engaging member 72 is able to be connected to the load 14 (e.g. bicycle). As the elongated member 70 is drawn downwardly from the first spool 60, the main shaft 44 rotates thereby preventing the gerotor 42 from applying a dampening force upon the first spool 60 as illustrated in FIGS. 6 through 8 of the drawings. The catch member 64 catchably engages one of the cogs of the sprocket 68 thereby preventing the first spool 60 from drawing the elongated member 70 upwardly as shown in FIG. 8 of the drawings.

Figure 11A:
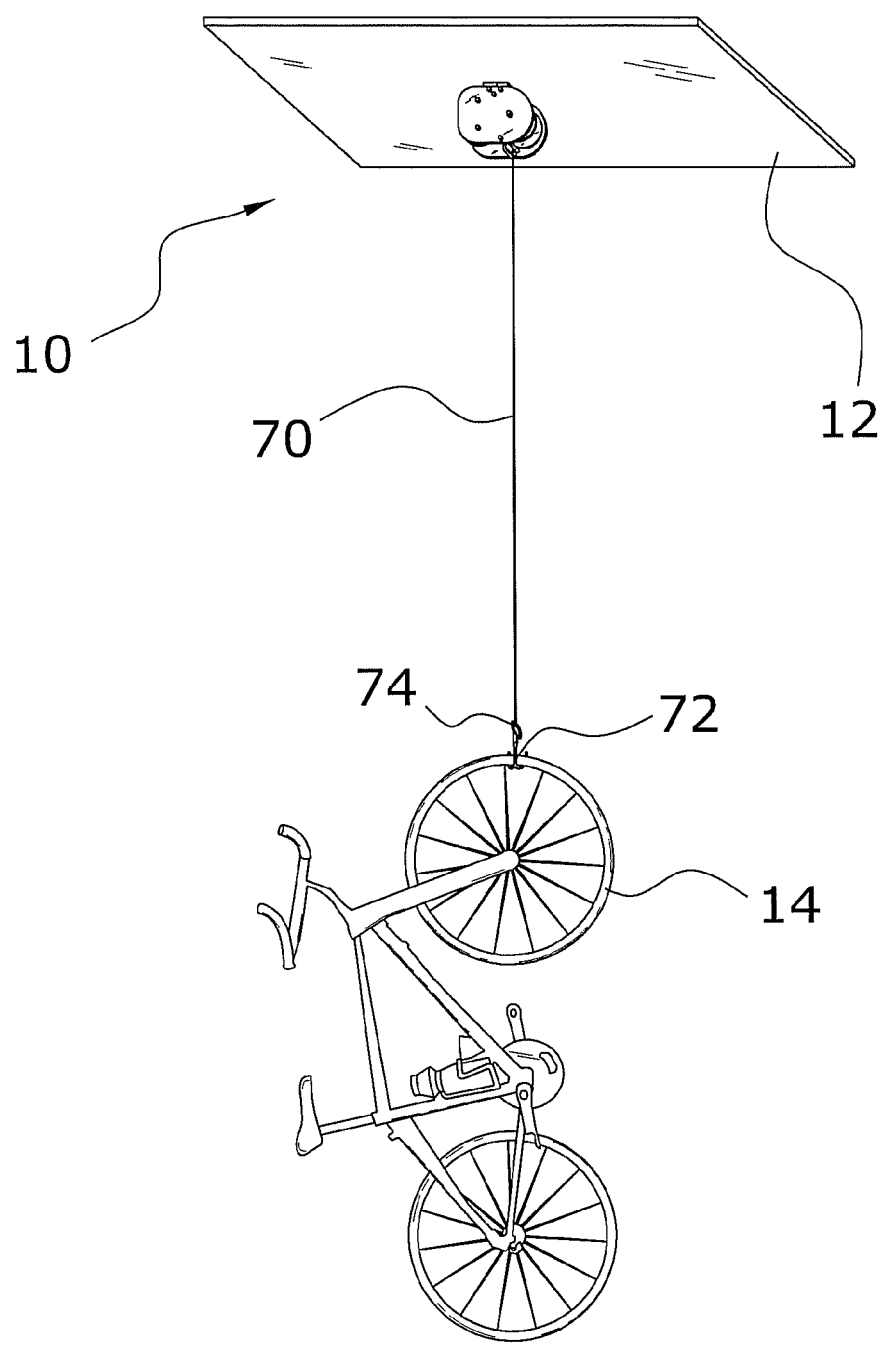
FIG. 11a is a lower perspective view of the present invention supporting a bicycle in a lowered position.
Figure 11B:
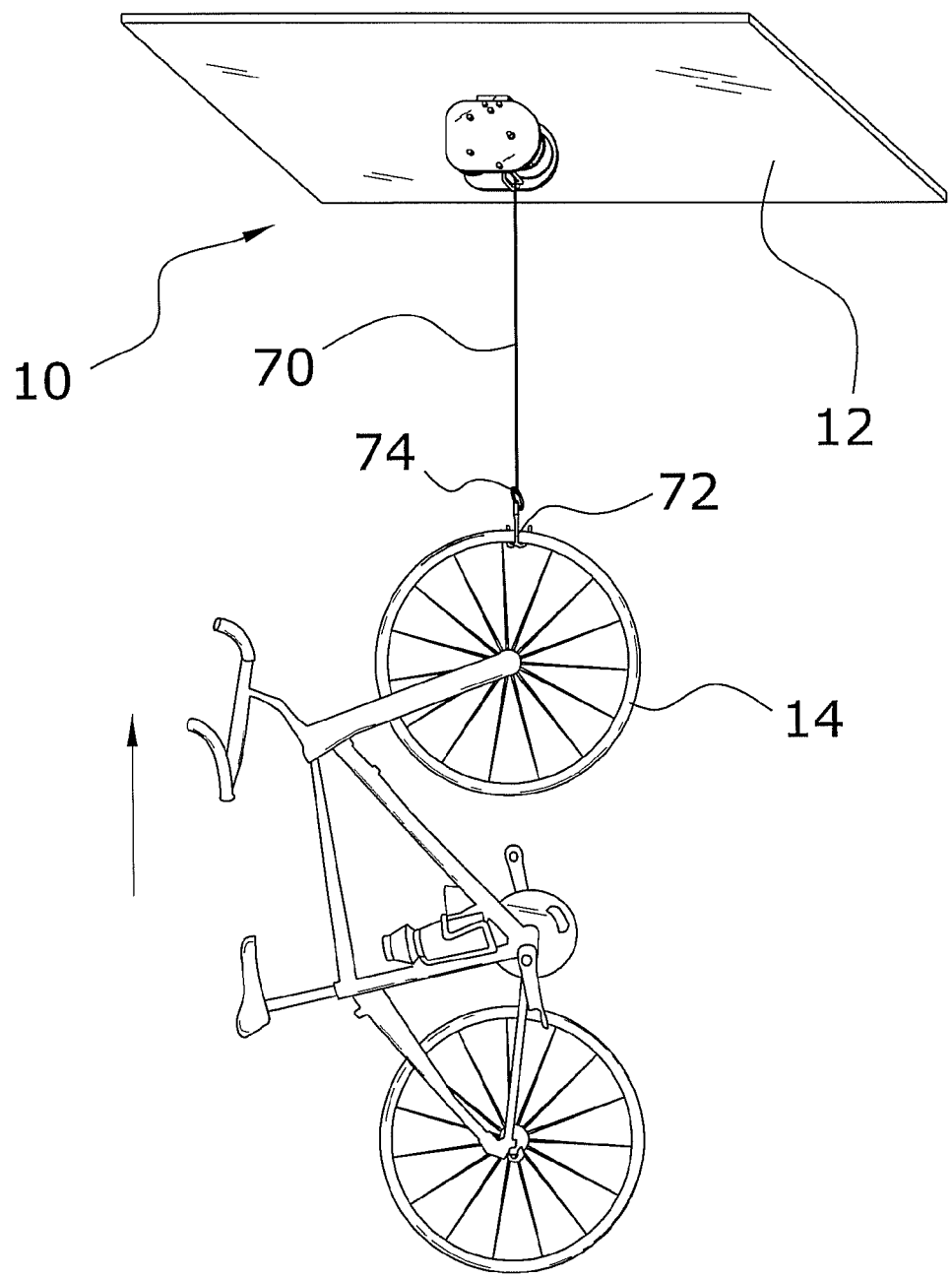
FIG. 11b is a lower perspective view of the present invention lifting a bicycle.

The load 14 is then attached to the engaging member 72 as shown in FIG. 11a of the drawings. The user then pulls downwardly upon elongated member 70 until the catch member 64 is positioned within the recessed portion of the sprocket 68 as shown in FIG. 6 and then releases the elongated member 70 allowing the elongated member 70 with the load 14 to be drawn upwardly as shown in FIGS. 5 and 11b of the drawings. As shown in FIG. 5 of the drawings, when the catch member 64 enters the recessed area 69 of the sprocket 68, the catch member 64 is allowed to rotate into the raising position whereby the catch member 64 will not catch the cogs of the sprocket 68. As further shown in FIG. 5 of the drawings, when the elongated member 70 is raised the main shaft 44 is prevented from rotating because of the one way bearing 40 preventing rotational movement in the raising rotation. When the main shaft 44 is stationary, the gerotor 42 then must rotate about the main shaft 44 simultaneously as the first spool 60 rotates thereby damping the rotational movement of the first spool 60. The dampening by the gerotor 42 prevents the first spool 60 from drawing the elongated member 70 at an overly fast rate. The elongated member 70 is allowed to continue to raise by the rotational force applied by the first spring 52 and the second spring 56 with the catch member 64 sliding upon the cogs of the sprocket 68.

Figure 11C:
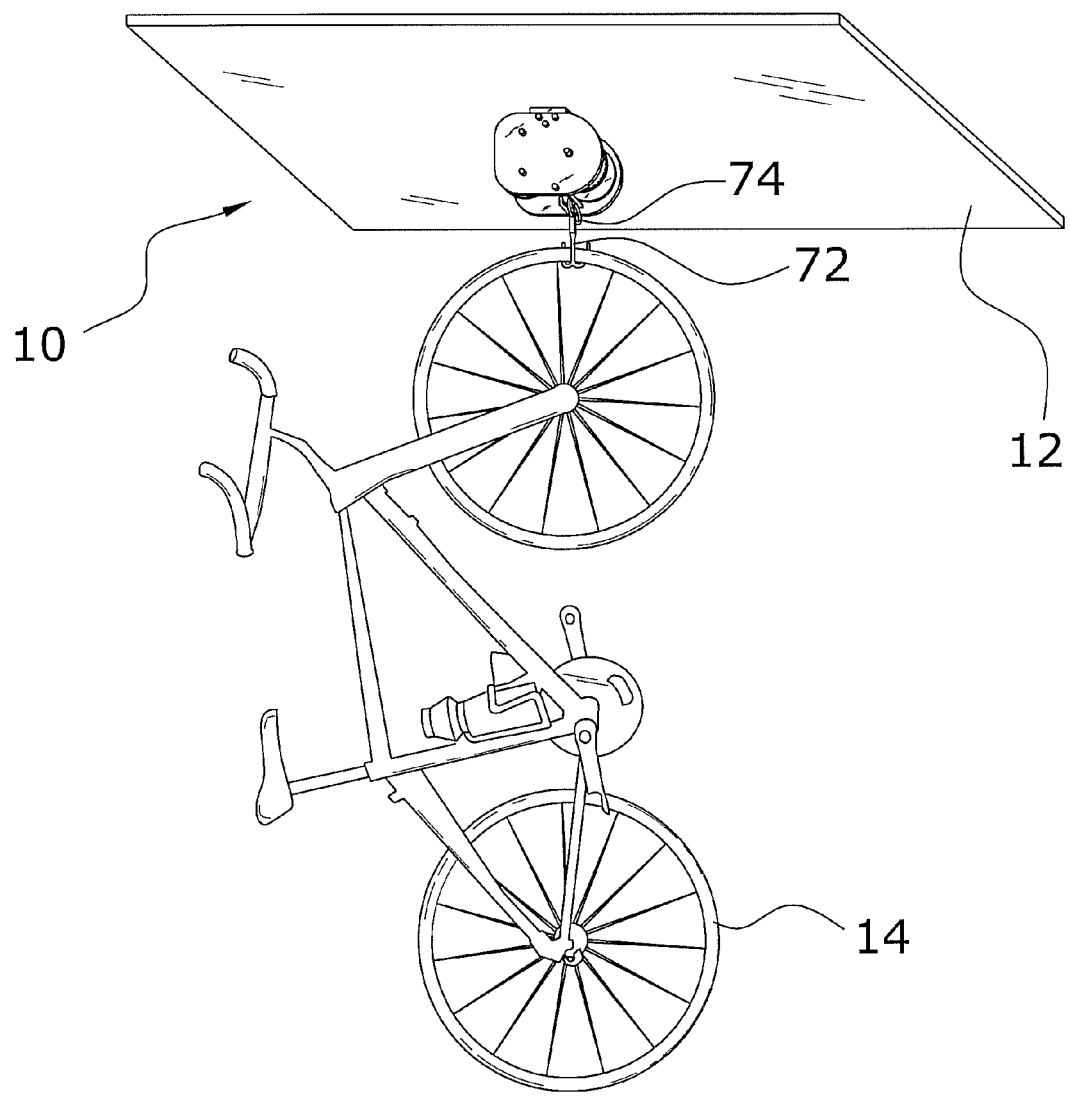
FIG. 11c is a lower perspective view of the present invention supporting a bicycle in a raised position.

As the elongated member 70 is drawn upwardly, the guide member 74 eventually engages the vertical guide 38 of the guide structure 34. Because the guide member 74 is comprised of a rounded or angled structure, the guide member 74 is forced to be aligned substantially parallel with respect to the vertical guide 38 as illustrated in FIGS. 12a through 12c of the drawings. When the guide member 74 engages the horizontal guide 36, the elongated member 70 is prevented from being raised further. The force of the first spring 52 and the second spring 56 retains the load 14 in the raised position as shown in FIG. 11c of the drawings.

When the load 14 is to be retrieved, the user grasps the load 14 and applies a downward force upon the same. The first spool 60 rotates in the free movement direction of the one way bearing 40 thereby preventing the dampening force of the gerotor 42 from being applied. The above process is then continued so the load 14 can be removed.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A retractable load support system, comprising:
    a frame;
    a gerotor attached to a main shaft within said frame, wherein said gerotor rotates upon said main shaft;
    a first spool attached to said gerotor;
    an elongated member attached to said first spool, wherein said first spool dispenses and receives said elongated member;
    an engaging member attached to said elongated member opposite of said first spool for engaging a load; and
    a biasing device connected to said gerotor applying a biasing force to said gerotor;
    wherein said main shaft is rotatably supported within said frame by a one way bearing allowing said main shaft to rotate when said elongated member is drawn downwardly to reduce said resistance of said gerotor.

2. The retractable load support system of claim 1, wherein said main shaft is supported substantially stationary within said frame by said one way bearing preventing said main shaft from rotating when said elongated member is drawn upwardly onto said first spool thereby lifting said load in a controlled manner.

3. The retractable load support system of claim 1, wherein said main shaft extends between a first sidewall and a second sidewall of said frame.

4. The retractable load support system of claim 1, including a mounting plate including at least one aperture attached to said frame to mount said frame to a ceiling.

5. The retractable load support system of claim 1, including a guide structure attached to said frame to guide said elongated member and to rotate said engaging member into a desired rotational alignment when said engaging member is in a fully raised position.

6. The retractable load support system of claim 5, wherein said guide structure includes a horizontal guide.

7. The retractable load support system of claim 5, wherein said guide structure includes a vertical guide.

8. The retractable load support system of claim 7, including a guide member attached between said elongated member and said engaging member, wherein said guide member engages said vertical guide when said engaging member is near said fully raised position.

9. The retractable load support system of claim 8, wherein said guide member is comprised of a ring structure.

10. The retractable load support system of claim 1, including a second spool attached to said gerotor and wherein said biasing device is attached to said second spool.

11. The retractable load support system of claim 10, wherein said biasing device is comprised of a first spring.

12. The retractable load support system of claim 11, wherein said first spring is comprised of a coiled metal band spring.

13. The retractable load support system of claim 12, wherein said first spring is comprised of a constant force spring, a constant torque spring or a variable force spring.

14. The retractable load support system of claim 12, including a first bracket attached to said frame, wherein said first spring is attached about said first bracket.

15. The retractable load support system of claim 12, wherein said biasing device is comprised of a second spring attached to a second bracket, wherein said second bracket is attached to said frame.

16. The retractable load support system of claim 15, wherein said second spring is comprised of a coiled metal band spring that overlaps said first spring on said second spool, wherein said second spring is comprised of a constant force spring, a constant torque spring or a variable force spring.

17. The retractable load support system of claim 1, including a ratchet assembly connected to said first spool to prevent raising of said elongated member when a user is pulling said elongated member downwardly.

18. The retractable load support system of claim 17, wherein said ratchet assembly is comprised of:
    a sprocket attached to said first spool, wherein said sprocket includes a plurality of cogs and at least one recessed area;
    a catch member pivotally attached to a support shaft, wherein said support shaft is attached to said frame, wherein said catch member catchably engages said cogs of said sprocket when in a lowering position and when said elongated member is raised, wherein said catch member slides over said cogs of said sprocket when in a raising position and when said elongated member is lowered, and wherein said catch member is movable between said raising position and said lowering position when aligned with said recessed area;
    a leverage member attached to said catch member; and a bias member attached to said leverage member and to said frame for applying a bias force to said catch member.

19. A retractable load support system, comprising:
a frame;
a gerotor attached to a main shaft within said frame, wherein said gerotor rotates upon said main shaft;
a first spool attached to said gerotor;
an elongated member attached to said first spool, wherein said first spool dispenses and receives said elongated member;
an engaging member attached to said elongated member opposite of said first spool for engaging a load;
a biasing device connected to said gerotor applying a biasing force to said gerotor;
wherein said main shaft is rotatably supported within said frame by a one way bearing allowing said main shaft to rotate when said elongated member is drawn downwardly to reduce said resistance of said gerotor;
wherein said main shaft is supported substantially stationary within said frame by said one way bearing preventing said main shaft from rotating when said elongated member is drawn upwardly onto said first spool thereby lifting said load in a controlled manner;
wherein said main shaft extends between a first sidewall and a second sidewall of said frame;
a mounting plate including at least one aperture attached to said frame to mount said frame to a ceiling;
a guide structure attached to said frame to guide said elongated member and to rotate said engaging member into a desired rotational alignment when said engaging member is in a fully raised position;
wherein said guide structure includes a horizontal guide;
wherein said guide structure includes a vertical guide;
a guide member attached between said elongated member and said engaging member, wherein said guide member engages said vertical guide when said engaging member is near said fully raised position;
wherein said guide member is comprised of a ring structure;
a second spool attached to said gerotor and wherein said biasing device is attached to said second spool;
wherein said biasing device is comprised of a first spring, wherein said first spring is comprised of a coiled metal band spring;
wherein said first spring is comprised of a constant force spring, a constant torque spring or a variable force spring;
a first bracket attached to said frame, wherein said first spring is attached about said first bracket;
wherein said biasing device is comprised of a second spring attached to a second bracket, wherein said second bracket is attached to said frame;
wherein said second spring is comprised of a coiled metal band spring that overlaps said first spring on said second spool, wherein said second spring is comprised of a constant force spring, a constant torque spring or a variable force spring; and
a ratchet assembly connected to said first spool to prevent raising of said elongated member when a user is pulling said elongated member downwardly, wherein said ratchet assembly is comprised of:
a sprocket attached to said first spool, wherein said sprocket includes a plurality of cogs and at least one recessed area;
a catch member pivotally attached to a support shaft, wherein said support shaft is attached to said frame, wherein said catch member catchably engages said cogs of said sprocket when in a lowering position and when said elongated member is raised, wherein said catch member slides over said cogs of said sprocket when in a raising position and when said elongated member is lowered, and wherein said catch member is movable between said raising position and said lowering position when aligned with said recessed area;
a leverage member attached to said catch member; and
a bias member attached to said leverage member and to said frame for applying a bias force to said catch member.

20. A retractable load support system, comprising:
a frame;
a gerotor attached to a main shaft within said frame, wherein said gerotor rotates upon said main shaft;
a first spool attached to said gerotor;
an elongated member attached to said first spool, wherein said first spool dispenses and receives said elongated member;
an engaging member attached to said elongated member opposite of said first spool for engaging a load;
a biasing device connected to said gerotor applying a biasing force to said gerotor; and
a guide structure attached to said frame to guide said elongated member and to rotate said engaging member into a desired rotational alignment when said engaging member is in a fully raised position;
wherein said guide structure includes a vertical guide.

* * * * *